Patented May 1, 1928.

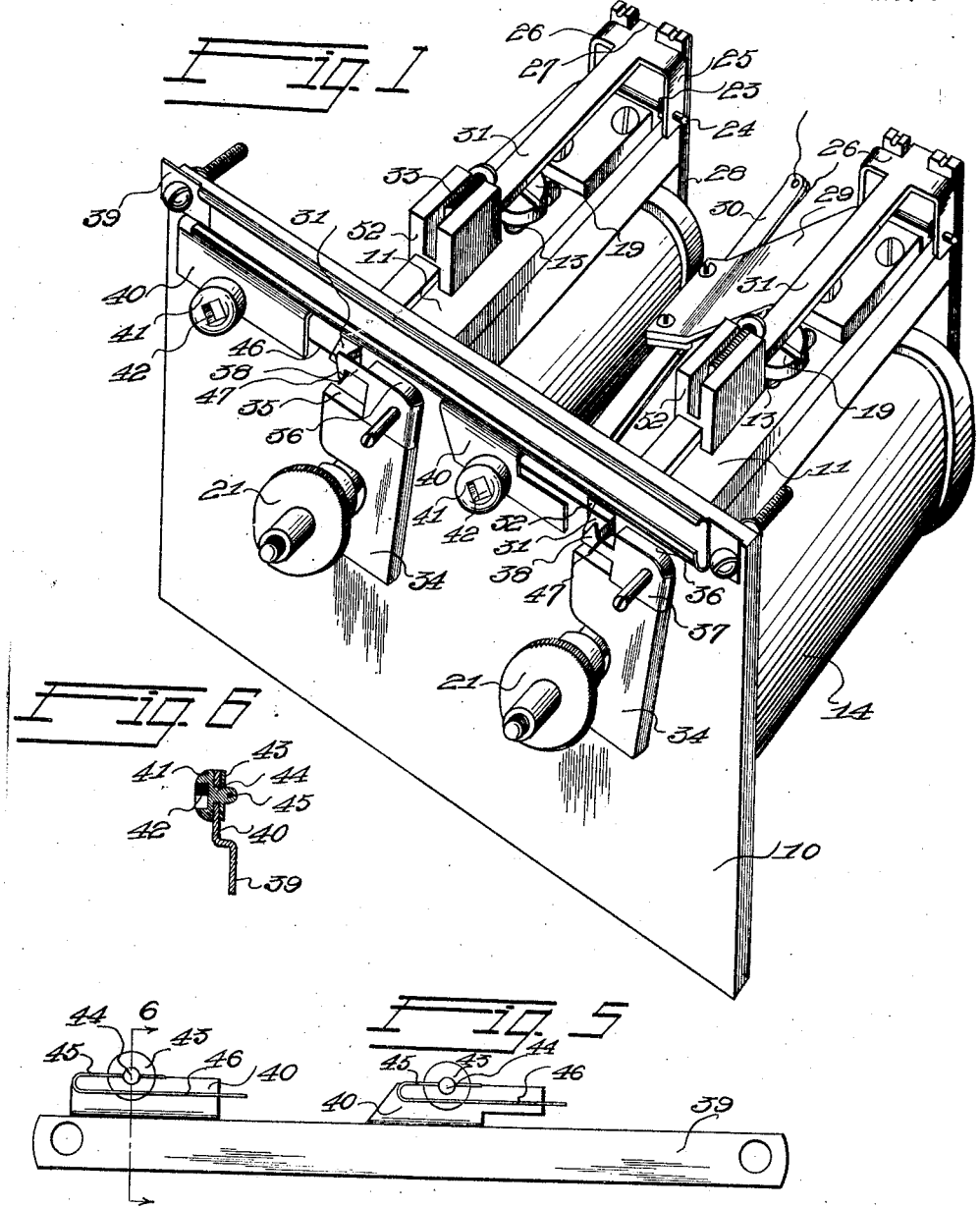

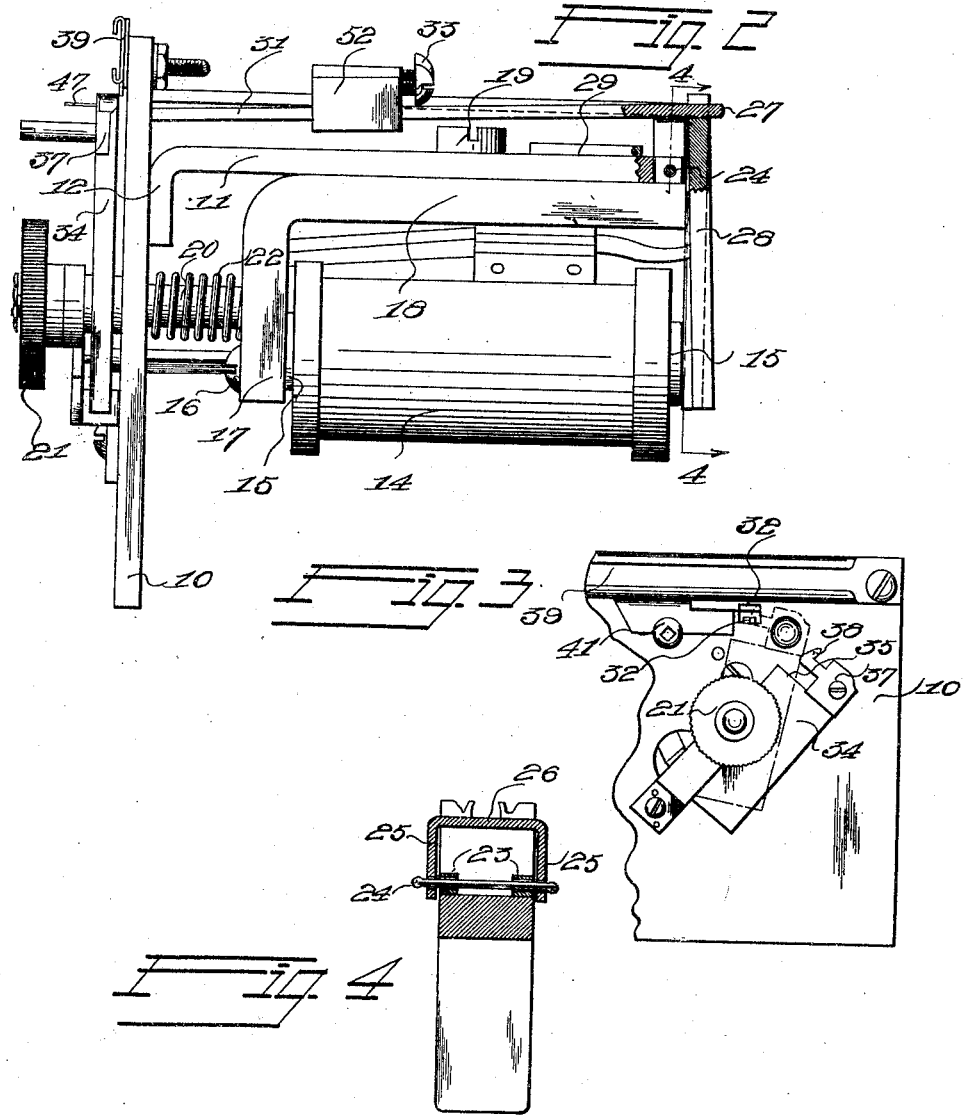

1,668,369

UNITED STATES PATENT OFFICE.

RICHARD M. HOPKINS, OF RUTHERFORD, NEW JERSEY, ASSIGNOR TO AMERICAN DISTRICT TELEGRAPH COMPANY, OF JERSEY CITY, NEW JERSEY, A CORPORATION OF NEW JERSEY.

DETECTOR APPARATUS.

Application filed February 24, 1927. Serial No. 170,579.

This invention relates to detector devices and has special reference to improvements in the detector device shown and described in my Patent 1,309,286, issued July 8, 1919.

Detector devices of this character are designed to indicate variations of current strength in a circuit, and particularly in a circuit including drop relays, such as are employed in burglar alarm systems and which are designed to indicate that there has been either an increase or a decrease in the current strength of the circuit.

In such systems it is common to employ detector instruments which will show either an increase or decrease in the current strength in order that a person of ill intentions may not succeed in tampering with the circuit by cutting out the regular source of current supply and cutting in some other source of more or less approximately the same value without detection. Before my prior invention described in the above mentioned patent it was common to use for this purpose two relays, one arranged to indicate in the event of rise in current strength, the other to indicate in the event of fall in current strength. By the former invention I provided a single relay which performed the functions of the two relays before employed.

In the construction of the former relay the armature common to such relays carried an arm, the free end of which engaged against a hook on the shutter or drop and in order to disengage this arm it was necessary to drag it over this hook and this movement was resisted by friction between the arm and the hook. While this friction was not great it was found that in some instances it was sufficient to interfere with the sensitiveness of the operation and that there was a possibility, through careful manipulation, of tampering with the circuit without causing the shutter to drop. In my former invention I provided an adjustable weight for balancing the armature but due to the friction between the arm and the hook it was possible to position this weight so that it would readily interfere with the sensitiveness necessary in such an instrument and, moreover, with the single relay magnet which I there employed a very slight misadjustment of this weight would render the relay extremely sensitive to the opposite condition, that is to say, if the relay was rendered very sensitive to increase of current strength by such misadjustment it would be comparatively insensitive to decrease of current strength and vice versa.

The principal objects of the present invention are to so improve the construction of such detector devices that they will be extremely and highly sensitive both to increase and decrease of current strength, to eliminate any frictional resistance due to the engagement of the arm and hook, to provide the possibility of adjustment for extreme sensitivity under either condition and other objects as will presently appear, the invention residing in certain novel improvements of construction hereinafter fully described and claimed and illustrated in the accompanying drawings wherein:

Figure 1 is a perspective view of the complete relay from the front thereof.

Figure 2 is a side elevation of said relay.

Figure 3 is a partial front elevation showing one of the shutters dropped in full lines and held raised in dotted lines.

Figure 4 is a section on the line 4—4 of Figure 2.

Figure 5 is a detail view showing the rear side inverted of a certain latch bar used herewith.

Figure 6 is a detail section on the line 6—6 of Figure 5.

In the present embodiment of the invention the device is so constructed that it is adapted to be set into a switch board panel. In the device there is provided a front plate 10 and projecting rearwardly from this front plate is a pair of bars 11 which have their front ends 12 securely fixed to the front plate. Each of these bars 11 is provided with a slot 13 which extends vertically through the respective bar, the slot being arranged longitudinally of such bar. Below each bar 11 is located a magnet 14 having a core 15 and to the forward end of the core 15 is secured by a screw 16 the vertical leg 17 of an L-shaped bar of magnetic material. This L-shaped bar has a horizontal leg 18 which engages the under side of the respective bar 11 and is held there by means of a screw 19 which passes through the respective slot 13 with its head resting on top of the bar 11 while its lower end is screwed into the leg 18. Extending forwardly from the leg 17 is a rod 20 which has a reduced forward end passing through the plate 10 and having thereon a knurled adjusting nut 21. Between the leg 17 and the plate 10 a spring 22 surrounds the rod 20 and urges the L-shaped bar and magnet 14 rearwardly. The nut 21 serves to adjust the magnet toward the plate 10 against the action of the spring 22 and, when thus adjusted, the screw 19 may be used to lock the magnet firmly in adjusted position. The rear end of each bar 11 is forked and through the arms 23 of this fork loosely passes a pivot pin 24 which also passes through the vertical leg 25 of an armature supporting member, this loose pivoting preventing any binding of the arms during oscillatory movements. The legs 25 are connected at their upper ends by a cross member 26 and from this cross member 26 there extends rearwardly a finger 27 which fits into the forked upper end of an armature 28 which is thus supported to have its lower end extend down to the rear of the core 15. On each of the bars 11, toward the rear thereof, is secured a plate 29 which extends laterally and downwardly and supports at its lower end a pair of normally spaced contact 30 which are insulated from each other and to which are connected the wires of the local alarm circuit, these wires not being deemed necessary here to be shown.

Extending forwardly from each member 26 is an arm 31 the forward extremity of which passes through a suitable opening 32 in the plate 10 and projects slightly beyond the front face of said plate. Slidable on each arm 31 is a counterweight 52 of H-shape in cross section, the respective arm 31 being received between the lower legs of this counter-weight while a lock screw 33 is used to spread the upper legs to grip the respective arm 31. By this means the position of the armature 28 may be adjusted with extreme delicacy.

As is well understood in a device of this character one magnet 14 and its armature is so arranged and proportioned that the current passing through the magnet winding produces an effect barely sufficient to hold the armature in contact with the magnet core so that a minute drop in the current will release the armature and permit the forward end of the arm 31 to drop. In like manner the remaining magnet and its armature are so proportioned and arranged that the armature is normally out of contact with the core of the magnet but will be moved into contact by the effect produced by minute increase in the current passing through the winding of this magnet thus causing the respective arm 31 to lift at its forward end. Obviously adjustment of the counter-weights 52 can be made to give any required degree of delicacy in the action of these relay magnets.

For each magnet 14 there is provided an annunciator drop or shutter 34 which is pivoted to swing into either the full line position shown in Figure 3 or into the dotted line position shown in said figure. The upper end of each shutter or drop is cut away at one corner as at 35 to leave the upper lip projecting portion 36 on the front face of which is secured a plate 37 carrying a hook 38. The hook 38 of the drop 34, associated with the magnet having the normally unattracted armature being turned upwardly while the similar hook on the other magnet is turned downwardly. Secured to the front face of the plate 10 adjacent its upper edge is a bar 39 having a pair of downwardly extending supports 40 each carrying a button 41 socketed at 42 to receive an adjusting tool. This button extends through the support 40 as shown in Figure 6 and carries at the rear face of said support a friction disc 43. The shank 44 of the button extends rearwardly of the disc 43 and in this shank is fixed the shorter arm 45 of a U-shaped wire spring having a longer arm 46 provided with a forwardly extending finger 47 which is engaged by the respective hook 38 to latch it upon the annunciator drop being set.

The springs 46 are made of fine gauge wire and engage the hooks 38 with a very delicate touch.

Hence there is practically no frictional resistance to their removal from the hooks. The end of the lever arm 31 attached to the normally unattracted armature, shown on the right in Figure 1, is arranged below the spring wire 46 and when the armature is attracted upon increase in current, the lever arm lifts the finger 47 from engagement with the hook 38 of the annunciator drop. The arm 31, attached to the normally attracted armature, shown at the left side of Fig. 1, lies above the spring wire 46 and when the armature moves away from the magnet pole, due to a slight decrease in current, the lever 31 pushes the spring finger 47 down from the hook. In both cases the button 42 is turned to adjust the spring wire 46 so that the lever arm 31 does not engage the spring wire until just before the end of its travel and is therefore moving at its greatest speed and has attained its greatest momentum. With this arrangement also, the lever 31, on the right of Fig. 1, which is moved upwardly, strikes the spring wire at the instant when the armature is close to the magnet pole and hence the magnetic pull is strongest. Likewise the lever 31 on the left of Fig. 1, which is moved downward, strikes the spring wire 46 when the armature has been released by the decreased current and moved away from the magnet pole where the magnetic field is weakest and exerts little restraint, thus permitting the arm 31 to be moved downward by the weight 52 with increasing velocity. By relieving the lever arms 31 of any frictional engagement with the hooks of the annunciator drops, and by mounting the support for the armatures and lever arms loosely upon the bearing pins, the moving parts are free to respond to a very slight increase or decrease of the current in the supervisory circuit. The system is therefore far more sensitive and more certain to indicate any slight change from normal condition than prior systems of this character. While it has not been deemed necessary to show the details of the local circuit closure further than has already been described, it is well understood that the dropping of a shutter 34 serves to close a local circuit and give the necessary alarm.

I claim:

1. In an alarm relay, a magnet, a swinging armature therefor, an arm fixed to said armature and movable therewith, a signal drop having a hook for retaining the drop in set position, and a light wire spring member engaging the hook in set position of the drop and movable to release the drop, said spring member extending across the path of movement of said arm and operatively engaged by the arm upon movement thereof.

2. In an alarm relay, a magnet controlled arm pivoted for oscillatory movement, a light wire spring latch member, means to support said latch member in position to extend across the path of said arm, and an annunciator drop engaged by the latch in set position and disengaged from the latch upon movement of said arm.

3. In an alarm relay, a magnet controlled arm pivoted for oscillatory movement, a light wire spring latch member including a projecting finger, means to support said latch member in position to extend across the path of said arm, an annunciator drop mounted to swing adjacent said latch member, a hook carried by the drop, the finger engaging the hook in set position of the drop.

4. In an alarm relay, a magnet controlled arm pivoted for oscillatory movement, a light wire spring latch member including a projecting finger, means to support said latch member in position to extend across the path of said arm, an annunciator drop mounted to swing adjacent said latch member, a hook carried by the drop, the finger engaging the hook in set position of the drop, said latch supporting means being revoluble to adjust the relative positions of the latch and hook.

5. In an alarm relay as set forth in claim 3, a loose pivot supporting said arm to prevent any binding of the arm during its oscillatory movements.

6. In an alarm relay as set forth in claim 4, a counter-balancing weight shiftable along said arm, and means to clamp the weight in adjusted position on the arm.

In testimony whereof I affix my signature.

RICHARD M. HOPKINS.